Patented Nov. 10, 1931

1,831,702

UNITED STATES PATENT OFFICE

PAUL CADRÉ, OF PARIS, FRANCE, ASSIGNOR TO SOCIETE SUPERCIMAR S. A., OF GENEVA, SWITZERLAND

QUICK HARDENING CEMENT WITH HIGH RESISTANCE

No Drawing. Application filed May 11, 1926, Serial No. 108,425, and in France May 22, 1925.

It already has been proposed to manufacture slow setting cements having, as far as hardening is concerned, qualities similar to those of Portland cement, by using blast-furnace slags (or artificial puzzolanes, etc. . . .) to which relatively large quantities of gypsum were added in excess of the allowable limit of 2% for Portland cement. It was thus proposed, for instance, to mix granulated blast-furnace slag with 16% to 20% of gypsum dried in blocks before its pulverization, and subsequently to grind and finely pulverize this mixture; the industrial results obtained by this method were absolutely irregular and practically worthless. It was furthermore always admitted that by the addition of gypsum to hydraulic lime the setting was delayed and that such addition would have a similar effect upon cements obtained from blast-furnace slags, or upon similar cements.

The invention has for its object a process of manufacturing cement containing a large proportion of natural substances with high contents of lime sulphate (such as gypsum, anhydrite or karstenite and the like) but which, contrary to the known cements with high contents of gypsum, hardens very rapidly and offers a high resistance from the begin of setting; it is more particularly thereby characterized that the various constituent substances of the cement, such as slag, clinkers and gypsum or any other calcium sulfate mineral, after previous drying, are each separately finely powdered, and that after their cooling, the finely powdered cement constituents are intimately mixed.

According to the heretofore known methods the slags, clinkers or similar elements were ground together with the gypsum. Extended searches and experiments by the inventor now show that the water contained in the gypsum (its combined or crystallization water and its free moisture water) as well as the free moisture water contained in the slag was liberated during grinding due to the influence of the increased temperature, so that the setting in of a reaction between the several elements present took place in the mill proper; this reaction was more or less pronounced according to the quantity of liberated water. The setting partially took place in the breaker itself as soon as a certain degree of fineness was realized and its action thereafter was merely limited to a renewed reduction into powder of already set cement particles. Furthermore the reaction between the liberated water and the other elements proceeded, even after the materials had left the apparatus. This explains why the products obtained by this method were of very poor quality and, at the given moment, did not respond to the setting reaction.

The invention is particularly characterized by the fact that the natural substances with high percentage of lime sulphate (i. e. gypsum, anhydrite or karstenite and the like) are previously and separately freed from all their free moisture, finely pulverized, (losing thereby a more or less important part of their crystallization water if such is present) and then cooled off, while the other elements (slags or similar matters, and clinkers or equivalent cement elements) are separately dried if necessary in order to eliminate their free moisture, finely pulverized and cooled off, and the obtained powders are only then thoroughly mixed in the required proportions at a normal temperature.

The pulverization of the anhydrite (karstenite) is preferably carried to a higher degree of fineness than the slags, and in such manner that each particle of the slag which forms the greater part of the cement mixture, shall be acted upon by one corresponding particle of the anhydrite. For example, the slags will be reduced to a fineness leaving not more than from 7% to 10% of residue upon a sieve having 4.900 meshes per cm.$^2$, while the anhydrite will be pulverized to a fineness leaving but 2% to 3% upon the same sieve; the clinkers are preferably reduced to the same state of fineness as the anhydrite.

Preferably the slags or their equivalent are treated separately by being first dried so as to dissipate the hydration water and then pulverized, while the clinkers are likewise separately pulverized.

The hereafter described operation is given by way of example.

The slags are put through a dryer at a temperature of approximately 110 to 150° C. so as to dissipate their hydration water. They are then transferred to a breaker, called "finishing tube mill" in which they are reduced to a fineness leaving a residue of approximately 7% upon a sieve with 4,900 meshes per cm.² and finally carried into the silos by means of elevators or the like. During their transport the slags are cooling off and their hygrometric stability, which was lost due to the increased temperature during grinding, is reestablished.

On the other hand the clinkers, after being likewise ground to a fineness leaving a residue of approximately 2% to 3% upon a sieve with 4,900 meshes per cm.² are transferred into an independent silo.

The anhydrite or karstenite is first dried so as to free same from its free moisture and then ground to a greater fineness than that of the slags, i. e. leaving a residue of 2% to 3%; the powder is then brought into a special silo, cooling off during its transportation, thereby likewise reinstating the hygrometric stability which was lost due to the elevation of the temperature in the mill.

The three pulverized elements are then intimately mixed under normal temperature in proportions varying according to the chemical composition of the elements; the following proportions have already given excellent results: slags 80%, clinkers 5%, and anhydrite 15%.

I obtain by this method quick hardening cements having a considerably greater strength than the highest grade quick hardening cements known, strength which even surpasses that of the aluminous, so called "cast cements".

It will be noted that instead of clinkers, other equivalent cement elements of good quality may be used. The slag of any desired quality or composition may be replaced by natural puzzolanes. The anhydrite or karstenite may be replaced by gypsum which has been either previously baked or preferably successively dried and pulverized so that its total water contents will not exceed 5%. In this latter case it is impossible to completely dry the gypsum even when treating small particles of raw gypsum and a certain quantity of crystallization water will be retained.

In order to obtain the best results it is necessary to effect the grinding step by step so that at each successive grinding particles of increasing fineness are desiccated until a powder of the desired fineness and dryness is finally obtained.

As far as the hardness and quickness of hardening is concerned it is substantially immaterial whether I use anhydrite, raw gypsum, or partially or totally dehydrated gypsum. The presence of about 15% calcium sulphate is the vital point, as far as this substance is concerned.

What I claim is:

1. A process for the production of cement, which comprises separately drying, grinding and cooling to normal temperatures substantially 80% blast furnace slag, substantially 5% clinker, and substantially 15% calcium sulphate and mixing said ground substances.

2. A cement comprising a mixture of substantially 80% dry pulverized blast furnace slag, substantially 5% pulverized clinker and substantially 15% dry pulverized calcium sulphate, said substances having been cooled to normal temperatures before mixing.

In testimony whereof I have hereunto set my hand.

PAUL CADRÉ.